United States Patent
Torii et al.

(10) Patent No.: US 6,923,157 B2
(45) Date of Patent: Aug. 2, 2005

(54) THROTTLE DEVICE FOR INTERNAL COMBUSTION ENGINE

(75) Inventors: Katsuya Torii, Anjo (JP); Hiroki Shimada, Oobu (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/806,381

(22) Filed: Mar. 23, 2004

(65) Prior Publication Data

US 2004/0187844 A1 Sep. 30, 2004

(30) Foreign Application Priority Data

Mar. 28, 2003 (JP) ........................................ 2003-091807

(51) Int. Cl.[7] .............................. F02D 9/10; F02D 11/10
(52) U.S. Cl. ........................ 123/337; 123/399; 251/305
(58) Field of Search ................................. 123/336, 337, 123/361, 399; 251/214, 305

(56) References Cited

U.S. PATENT DOCUMENTS 5,758,977 A  6/1998 Bickle et al. ............... 384/276
6,626,421 B2 * 9/2003 Torii et al. .................. 251/305
6,691,678 B1 * 2/2004 Hashimoto et al. ......... 123/399
2001/0037794 A1 11/2001 Wayama et al. ............ 123/399

FOREIGN PATENT DOCUMENTS

JP  A-H11-173227  6/1999
JP  2001-289068  10/2001

* cited by examiner

Primary Examiner—Tony M. Argenbright
(74) Attorney, Agent, or Firm—Nixon & Vanderhye P.C.

(57) ABSTRACT

A throttle device for an internal combustion engine designed to absorb variations in dimensions of components by centering a closed-bottom tube of an integral plug-type slide bearing with a plastic shaft part of a throttle shaft, inserting a tube of the slide bearing in a ring-shaped clearance formed between an inner circumference of a first shaft insertion hole of a first bearing support of a throttle body and outer circumference of a first sliding part of the plastic shaft, then fixing by welding a ring-shaped end face of a flange of the slide bearing to a ring-shaped end face of the first bearing support using a welding method such as laser welding.

7 Claims, 4 Drawing Sheets

THROTTLE DEVICE FOR INTERNAL COMBUSTION ENGINE

BACKGROUND OF THE INVENTION

1. Field of the Invention

The present invention relates to a throttle device for an internal combustion engine, more particularly relates to a bearing structure of an electronic control type throttle control device for controlling an opening degree of a throttle valve in accordance with an amount of operation of a throttle by a drive motor or other actuator.

2. Description of the Related Art

As shown in FIG. 4, in the related art, there has been proposed a throttle device for an internal combustion engine provided with a throttle valve for controlling an amount of intake air to the internal combustion engine, a throttle shaft 102 forming a shaft part of the throttle valve 101, a throttle body 104 operably holding the throttle valve 101 in a tubular shaped bore wall 103, a slide bearing 107 press fit inside a first bearing support 105 provided so as to stick out to one side from the outer circumference of the bore wall 103 and rotatably supporting a first sliding part of the throttle shaft 102, a gear side slide bearing 108 press fit inside a second bearing support 106 provided so as to stick out to the other side from the outer circumference of the bore wall 103 and rotatably supporting a second sliding part of the throttle shaft 102, a plug 109 for sealing an open side of a first shaft insertion hole 111 formed in the first bearing support 105, and an oil seal 110 for sealing an open side of a second shaft insertion hole 112 formed in the second bearing support 106. Further, there is known a throttle device for an internal combustion engine forming a closed-bottom boss, for affixing ball bearings rotatably bearing the two ends of the throttle shaft holding and affixing the throttle valve, separately from tubular shaped boss wall forming an intake passage inside the plastic throttle body (for example, see Japanese Unexamined Patent Publication (Kokai) No. 11-173227 (pages 1 to 6 and FIG. 1 to FIG. 9)).

There is also known a throttle device for an internal combustion engine forming the plug 109 shown in FIG. 4 by a material with a good slidability and forming it integrally with the slide bearing 107 for the purpose of reducing costs by supporting one end of the throttle shaft holding and affixing the throttle valve by a ball bearing and bearing the other end of the throttle shaft by a cap-shaped plane bearing (integral plug-type slide bearing) (for example, see the specification of U.S. Pat. No. 5,758,977 (pages 1 to 5 and FIG. 1 and FIG. 2) and Japanese Unexamined Patent Publication (Kokai) No. 2001-289068 (pages 1 to 9 and FIG. 1 to FIG. 7)).

The integral plug-type slide bearing carried in the throttle device for an internal combustion engine described in the specification of U.S. Pat. No. 5,758,977 and Japanese Unexamined Patent Publication (Kokai) No. 2001-289068 is open at one end for insertion of the shaft and forms a closed-bottom cup shape at its other end. The integral plug-type slide bearing is press fit at the outer circumference of its tube inside the inner circumference of a bearing support of the throttle body. Further, the tubular inside circumference of the integral plug-type slide bearing receives the throttle shaft and bears the other end of the throttle shaft so as to enable sliding and rotation. Due to this, the integral plug-shaped slide bearing not only has the function of a slide bearing, but also the function of preventing entry of dust from the outside to the inside of the bore wall (intake passage side) or the function of preventing leakage of a fluid (air, liquid) from the inside of the bore wall to the outside.

However, in the throttle device for an internal combustion engine described in the specification of U.S. Pat. No. 5,758,977 and Japanese Unexamined Patent Publication (Kokai) No. 2001-289068, since the integral plug-type slide bearing is press fit at the outer circumference of its tube inside the inner circumference of the bearing support of the throttle body, a high dimensional precision is required for the inner and outer diameters of the throttle valve, throttle shaft, bore wall of the throttle body, bearing support of the throttle body, and tube of the integral plug-type slide bearing.

The reason is that if there is a large variation in these dimensions, the clearance between the outer circumference of the disk of the throttle valve and the inner wall of the bore wall of the throttle body would become larger when rotational movement of the throttle valve is stopped by a full close stopper etc. at the full close position (when the throttle valve is fully closed) and the amount of leakage of the intake air will increase when the throttle valve is fully closed. Due to this, the idling speed of the internal combustion engine will become higher than the target value, so the problem will arise of the inability of normal idling control.

If moving the full close position of the throttle valve too much to the closing side so as to solve this problem, that is, to reduce the amount of leakage when the valve is fully closed, before the rotational motion of the throttle valve is stopped by the full close stopper etc. at the full close position, the outer circumference of the disk of the throttle valve will interfere with the inner circumference of the bore wall of the throttle body and lock and therefore the problem will arise of the inability to stop the throttle valve at a predetermined full close position.

Further, if enlarging the ring-shaped clearance between the outer circumference of the sliding part of the throttle shaft and the inner circumference of the tube of the integral plug-type slide bearing so as to absorb the variation in the inner and outer diameters and other dimensions of the throttle valve, throttle shaft, bore wall of the throttle body, bearing support of the throttle body, and tube of the integral plug-type slide bearing, the rotational displacement of the sliding part of the throttle shaft due to shifting of the throttle shaft will increase and abnormal wear will occur at the inner circumference of the tube of the integral plug-type slide bearing. Due to this, if the sliding part of the throttle shaft sticks or other problems arise, the valve will lock and the opening degree of the throttle valve will no longer be able to be controlled.

Further, if forming the throttle body and the throttle valve integrally by plastic, the dimensional precision or parts precision will become poorer due to molding shrinkage etc. compared with machined parts, so the problem will arise of the precision of assembly becoming very poor if press fitting the outer circumference of the tube of the integral plug-type slide bearing in the inner circumference of the bearing support of the throttle body.

Therefore, even if forming the boss holding the ball bearing separately from the bore wall of the throttle body so as to improve the precision of formation like in the throttle device for an internal combustion engine described in Japanese Unexamined Patent Publication (Kokai) No. 11-173227, it will be necessary to consider not only the variations in inner and outer diameters and other dimensions of the throttle valve, throttle shaft, bore wall of the throttle body, bearing support of the throttle body, and tube of the integral plug-type slide bearing, but also precision of assembly of the boss in the bore wall of the throttle body, so the above problem is still not solved.

SUMMARY OF THE INVENTION

An object of the present invention is to provide a throttle device for an internal combustion engine able to improve the precision of assembly of the tube of the integral plug-type slide bearing in the bearing support of the throttle body and able to reduce the number of assembly steps. Another object is to provide a throttle device for an internal combustion engine able to reduce the amount of leakage when the throttle valve is fully closed and to perform normal idling control. Still another object is to provide a throttle device for an internal combustion engine able to prevent abnormal wear of the bearing of integral plug-type slide bearing due to an increase in the displacement of the sliding part of the throttle shaft due to shifting of the throttle shaft and to prevent valve lock and other problems.

To attain the above objects, according to a first aspect of the invention, there is provided a throttle device for an internal combustion engine comprised of a throttle shaft rotating integrally with a throttle valve and having a sliding part with respect to a bearing at one end, a throttle body having a bore wall holding inside it the throttle valve in an operable state and a tubular bearing support supporting the sliding part of the throttle shaft, and an integral plug-type slide bearing accommodated and held in an inner circumference of the bearing support of the throttle body, rotatably supporting the sliding part of the throttle shaft, and air-tightly closing an opening of the bearing support of the throttle body, the throttle body having in the bearing support a shaft insertion hole in which the sliding part of the throttle shaft is inserted and having a ring-shaped end face at an open side of the bearing support, and the integral plug-type slide bearing having a closed-bottom tube rotatably and slidably supporting the sliding part of the throttle shaft and fit at its outer circumference in the shaft insertion hole with a clearance and a flange having an outer diameter larger than that tube and affixed to a ring-shaped end face of the bearing support.

That is, according to the first aspect of the invention, the sliding part of the throttle shaft is slidably and rotatably supported by being accommodated and held in the inner circumference of the tubular shaped bearing support of the throttle body, the integral plug-type slide bearing for air-tightly closing the opening of the bearing support of the throttle body is provided with tube for slidably or rotatably supporting the outer circumference of the sliding part of the throttle shaft at its inner circumference and a flange with an outer diameter larger than the tube, whereby the outer circumference of the tube of the integral plug-type slide bearing is fit with a clearance in the shaft insertion hole of the bearing support of the throttle body and the flange of the integral plug-type slide bearing is fixed to the ring-shaped end face of the tubular bearing support of the throttle body by welding, fusion, bonding, or another bonding method.

Due to this, it is possible to absorb variations in inner and outer diameters and other dimensions of the components of the throttle device for an internal combustion engine, that is, the throttle valve, throttle shaft, bore wall and bearing support of the throttle body, and tube of the integral plug-type slide bearing, so it is possible to improve the precision of assembly and reduce the number of assembly steps when assembling the tube of the integral plug-type slide bearing in the bearing support of the throttle body compared with the related art (press fitting outer circumference of tube of integral plug-type slide bearing into inner circumference of bearing support of throttle body).

According to a second aspect of the invention, there is provided a throttle device of the first aspect wherein the bearing support of the throttle body is formed integrally by a heat resistant plastic, the flange of the integral-plug type slide bearing is formed by the same type of plastic as the bearing support and has a ring-shaped end face fixed by welding to the ring-shaped end face of the bearing support, the ring-shaped end face of the bearing support is formed facing the outside from a center of the bore wall in an axial direction of the throttle shaft, and the ring-shaped end face of the flange is formed facing the center of the bore wall in an axial direction of the throttle shaft and facing the ring-shaped end face of the bearing support.

That is, according to the second aspect of the invention, when forming the tubular bearing support of the throttle body integrally by a heat resistant plastic and forming the flange of the integral plug-type slide bearing by a plastic of the same type as the bearing support of the throttle body, the ring-shaped end face of the flange formed facing the outside from the center of the bore wall in the axial direction of the throttle shaft is fixed by welding to the ring-shaped end face of the bearing supported formed facing the outside from the center of the bore wall in the axial direction of the throttle shaft.

Due to this, even with welding together plastic components with poor dimensional precision or parts precision due to molding shrinkage etc. compared with components made by machining, it is possible to absorb variations in inner and outer diameters and other dimensions of the components of the throttle device for an internal combustion engine, that is, the throttle valve, throttle shaft, bore wall and bearing support of the throttle body, and tube of the integral plug-type slide bearing, so it is possible to provide a method of assembly optimal for a plastic integral plug-type slide bearing to be assembled in a bearing support of a non-machined plastic throttle body.

According to a third aspect of the invention, there is provided a throttle device of the second aspect wherein when assembling the integral plug-type slide bearing into the bearing support of the throttle body, the tube is centered with the throttle shaft and the ring-shaped end face of the flange is fixed by welding to the ring-shaped end face of the bearing support.

That is, according to the third aspect of the invention, when assembling the integral plug-type slide bearing comprised of the plug and the slide bearing in the tubular bearing support of the throttle body, the tube of the integral plug-type slide bearing is centered with the throttle shaft forming the shaft part of the throttle valve, the tube of the integral plug-type slide bearing is inserted into the ring-shaped clearance formed between the inner circumference of the shaft insertion hole of the bearing support and the outer circumference of the sliding part of the throttle shaft, then the ring-shaped end face of the flange of the integral plug-type slide bearing is fixed by welding to the ring-shaped end face of the bearing support of the throttle body.

Due to this, even if the precision of the individual parts such as the throttle valve and the bore wall and bearing support of the throttle body is not that good, it is possible to absorb variations in the parts by centering the tube of the integral plug-type slide bearing, so it is possible to provide a method of assembly optimal for a plastic integral plug-type slide bearing to be assembled in a bearing support of a non-machined plastic throttle body. Further, it is possible to set the clearance between the outer circumference of the throttle valve and the inner wall of the bore wall at the time of full closing to the minimum extent, so it is possible to reduce the amount of leakage at the time of full closing of the throttle valve (idling operation) and perform normal idling control.

Further, it is possible to prevent an increase in the amount of leakage when the throttle valve is fully closed (idling operation), so it is possible to prevent over movement of the full close position of the throttle valve to the closing side. Therefore, there will be no phenomenon where, before the rotational motion of the throttle valve is stopped by the full close stopper etc. at the full close position, the outer circumference of the disk of the throttle valve will interfere with the inner circumference of the bore wall of the throttle body and lock and therefore the throttle valve can be stopped at a predetermined full close position. Further, there is no need to enlarge the clearance formed between the outer circumference of the sliding part of the throttle shaft and the inner circumference of the tube of the integral plug-type slide bearing, so it is possible to prevent abnormal wear of the bearing due to the increase in rotational displacement of the sliding part of the throttle shaft due to shifting of the throttle shaft and possible to prevent the problem of valve lock. Due to this, it is possible to control the opening degree of the throttle valve as targeted.

According to a fourth aspect of the invention, there is provided a throttle device of the first to third aspects, wherein the bearing support of the throttle body is integrally formed by a heat resistant plastic, an inner circumference of the shaft insertion hole is formed as a cylindrical surface centered about the axial center of the throttle shaft, the tube of the integral plug-shaped bearing is formed from a plastic of the same type as the bearing support and has an outer circumference fixed by fusing to the inner circumference of the shaft insertion hole, and the outer circumference of the tube is formed as a cylindrical surface centered about the axial center of the throttle shaft.

That is, according to the fourth aspect of the invention, when integrally forming the tubular shaped bearing support of the throttle body by a heat resistant plastic and forming the tube of the integral plug-type slide bearing by a plastic of the same type as the bearing support of the throttle body, the outer circumference of the tube formed as a cylindrical surface centered about the axial center of the throttle shaft is fixed by fusing with the inner circumference of the shaft insertion hole formed as a cylindrical surface centered about the axial center of the throttle shaft. Due to this, it is possible to absorb variations in the inner and outer diameters and other dimensions of the components of the throttle device for an internal combustion engine, that is, the throttle valve, the throttle shaft, the bore wall and bearing support of the throttle body, and the tube of the integral plug type slide bearing.

According to a fifth aspect of the invention, there is provided a throttle device of the fourth aspect wherein when assembling the integral plug-type slide bearing into the bearing support of the throttle body, a molten plastic is poured into the ring-shaped clearance formed between the outer circumference of the tube of the slide bearing and the inner circumference of the shaft insertion hole of the throttle body and the outer circumference of the tube of the slide bearing is fixed by welding to the inner circumference of the shaft insertion hole. Due to this, it is possible to absorb variations in the inner and outer diameters and other dimensions of the components of the throttle device for an internal combustion engine, that is, the throttle valve, the throttle shaft, the bore wall and bearing support of the throttle body, and the tube of the integral plug type slide bearing.

According to a sixth aspect of the invention, there is provided a throttle device of the first to fifth aspects, wherein the integral plug-type slide bearing has at least one of a function of rotatably and slidably supporting the sliding part of the throttle shaft, a function of preventing entry of foreign matter from the outside to the inside, and a function of preventing leakage of air from the inside to the outside.

According to a seventh aspect of the invention, there is provided a throttle device of the first to sixth aspects, wherein the integral plug-type slide bearing is formed integrally by insert molding by a material superior in slidability at only an inner circumference of the tube of the integral plug type slide bearing. Due to this, it is possible to prevent abnormal wear of the bearing due to sliding wear between the inner circumference of the tube of the slide bearing and the outer circumference of the sliding part of the throttle shaft.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

First Embodiment

Figure 1:
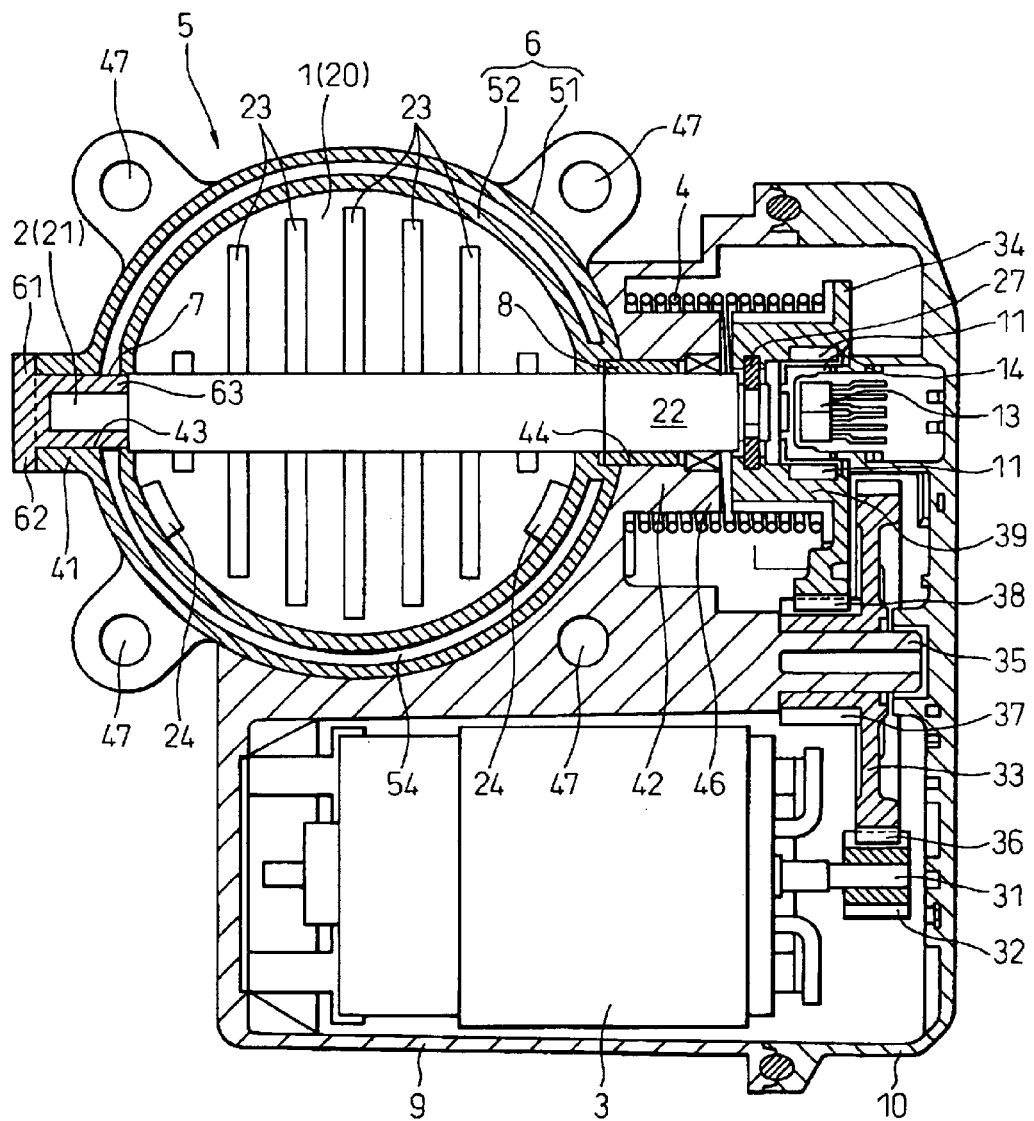
FIG. 1 is a cross-sectional view of the overall structure of an electronic control type throttle control device according to a first embodiment of the present invention.
Figure 2:
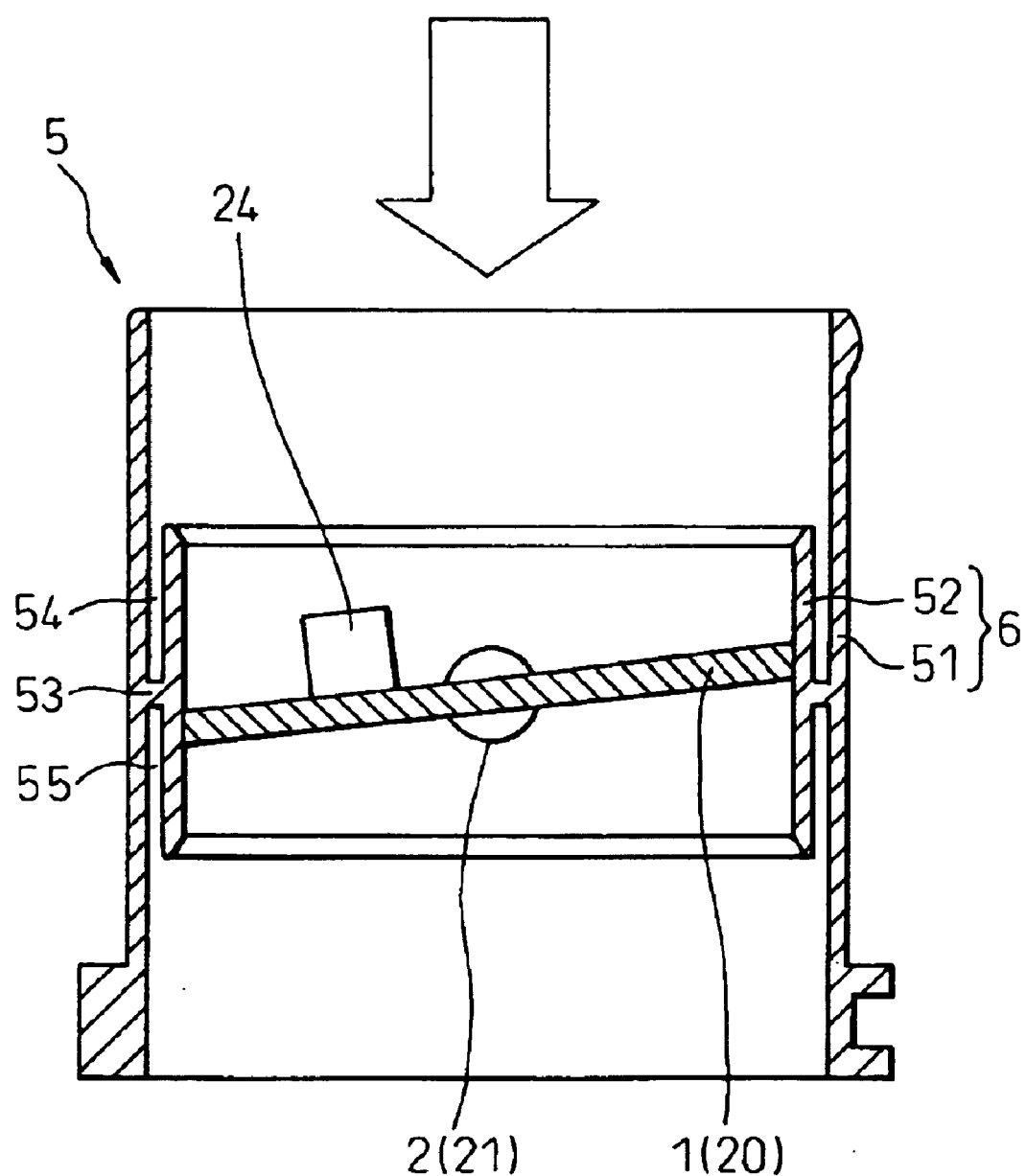
FIG. 2 is a cross-sectional view of a bore wall structure of a throttle body according to a first embodiment of the present invention.

FIG. 1 and FIG. 2 show a first embodiment of the present invention. FIG. 1 is a view of the overall structure of an electronic control type throttle control device, while FIG. 2 is a view of the structure of the bore wall of the throttle body.

The electronic control type throttle control device of the present embodiment is an intake control device of an internal combustion engine provided with a throttle valve 1 for controlling the amount of intake air of the internal combustion engine (hereinafter called simply an "engine"), a throttle shaft 2 forming a shaft part of the throttle valve 1, a drive motor 3 for driving the throttle valve 1 and the throttle shaft 2 in the full open direction (or full closed direction), a coil spring or other return spring (valve biasing means) 4 for biasing the throttle valve 1 and the throttle shaft 2 in the full closed direction, a reduction gear (power transmission) for transmitting rotational output of the drive motor 3 to the throttle valve 1 and the throttle shaft 2, an actuator case for rotatably housing the gears forming the reduction gear, a throttle body 5 formed with an intake passage inside it, and a not shown engine control unit (hereinafter referred to as an "ECU") for electronically controlling the drive motor 3.

The electronic control type throttle control device controls the rotational speed of the engine by controlling the amount of intake air flowing into the engine in accordance with the depression of an accelerator pedal (accelerator operation) of an automobile (not shown). Therefore, the ECU is connected to an accelerator opening degree sensor (not shown) for converting the amount of depression of the accelerator pedal to an electrical signal (accelerator opening degree signal) and outputting to the ECU how much the accelerator pedal is being depressed.

Further, the electronic control type throttle control device is provided with a throttle position sensor for converting the opening degree of the throttle valve 1 to an electrical signal (throttle opening degree signal) and outputting to the ECU how much the throttle valve 1 is opened. This throttle position sensor is comprised of a split-type (approximately block-shaped) permanent magnet 11 serving as the source of generation of a magnetic field, a split-type (approximately arc-shaped) yoke (not shown) magnetized by the permanent magnet 11, a Hall element 13 integrally attached to a gear cover 10 side so as to face the split-type permanent magnet 11, a terminal (not shown) comprised of a conductive metal sheet for electrically connecting the Hall element 13 and an outside ECU, and a stator 14 comprised of a ferrous metal material (magnetic material) concentrating the magnetic flux at the Hall element 13.

The split-type permanent magnet 11 and the split-type yoke are fixed by an adhesive etc. to the inner circumference of one component of the gear speed reduction device, that is, a valve gear 34. Note that the split-type permanent magnet 11 is arranged between two adjoining yoke parts. The split-type permanent magnet 11 of this embodiment comprised of a plurality of small substantially block-shaped permanent magnets arranged so that the same poles are at the same side so that the direction of magnetization becomes the vertical direction in FIG. 1 (in FIG. 1, the top being the N-pole and the bottom the S-pole). The Hall element 13 is generally called a non-contact type detection element and is arranged facing the inner circumference side of the permanent magnet 11. It is provided so that when the N-pole or S-pole magnetic field is generated at the detection face, an electromotive force is generated in accordance with the magnetic field (giving rise to a +potential when an N-pole magnetic field is generated, while giving rise to a −potential when an S-pole magnetic field is generated).

The throttle valve 1 is formed into a substantially disk shape by a plastic material (heat resistant plastic such as polyphenylene sulfide (PPS) or polybutylene terephthalate containing 30% glass fiber (PBTG30)). It is a butterfly type rotary valve controlling the amount of intake air taken into the engine and formed integrally at the outer circumference of a valve holding part of a plastic shaft part 21 of the throttle shaft 2. Due to this, the throttle valve 1 and throttle shaft 2 can be made integral and rotate together.

Here, one end face (upstream side in direction of flow of intake air for example) or two end faces of the plastic disk 20 of the throttle valve 1 of the present embodiment is/are integrally formed with reinforcement ribs 23 for reinforcing the plastic disk 20. Further, one end face of the plastic disk 20 of the throttle valve 1 is integrally formed with a full close stopper engaging with the full close stopper 24 formed integrally by plastic forming at the inner wall of the bore wall 6 of the throttle body 5.

The throttle shaft 2 is rotatably or slidably supported by first and second bearing supports of the throttle body 5 at its two ends. Here, the throttle shaft 2 of the present embodiment is comprised of a plastic shaft part 21 holding the throttle valve 1 and a metal shaft part 22 reinforcing the plastic disk 20 and the plastic shaft part 21 of the throttle valve 1 and formed by insert molding in the plastic shaft part 21.

The plastic shaft part 21 is formed into a substantially cylindrical shape by a plastic material (heat resistant plastic such as polyphenylene sulfide (PPS) or polybutylene phthalate containing 30% glass fiber (PBTG30)). One end (left end in FIG. 1) is exposed at the outer circumference of the throttle shaft 2 and functions at a first sliding part rotatably sliding at the first bearing support of the throttle body 5. Further, the metal shaft 22 is formed as a solid rod by a metal material such as stainless steel. The other end (right end in FIG. 1) is exposed at the outer circumference of the throttle shaft 2 and functions as a second sliding part rotatably sliding in the second bearing support of the throttle body 2.

Note that the outer circumference of the exposed part of the plastic shaft part 21 (first sliding part) and inner circumference of the first bearing support of the throttle body 5 have an integral plug-type slide bearing 7 attached between them. On the other hand, the outer circumference of the exposed part of the metal shaft part 22 and the inner circumference of the second bearing support of the throttle body 5 have a dry bearing (gear side slide bearing) 8 and an oil seal etc. attached between them. Further, the illustrated right end face of the metal shaft part 22 (end face sticking out into gear chamber explained later) has calked to it a ring plate shaped metal member 27 provided integrally with the inner circumference of one of the components of the reduction gear, that is, the valve gear 34.

Here, the actuator case of the present embodiment is comprised of a gear case (gear housing, case body) 9 formed integrally by plastic forming at the outer wall of the bore wall 6 of the throttle body 5 and a gear cover (sensor cover) 10 closing the open side of the gear case 9 and holding a throttle sensor.

The gear case 9 is formed in a predetermined shape by the same plastic material as the bore wall 9, holds and affixes the drive motor 3, and forms a gear chamber rotatably housing the gears forming the reduction gear inside it. Further, the inner wall of the gear case 9 is integrally formed with a full open stopper (not shown) for stopping the rotational motion of the throttle valve 1 in the full open direction at the full open position of the throttle valve 1.

The gear cover 10 is formed into a predetermined shape by a thermoplastic resin or other plastic material electrically insulating the terminals of the throttle position sensor. Further, the gear cover 10 has a part for engagement with a part provided at the open side of the gear case 9 and is attached to the open side end of the gear case 9 by rivets or screws (not shown) or heat bonding.

The drive motor 3 of the present embodiment is an electrically powered actuator (drive source) connected to motor connection terminals buried in the gear case 9 and gear cover 10 and making the motor shaft 31 rotate in the forward direction or reverse direction when powered. Further the reduction gear is a valve drive means which reduces the rotational speed of the drive motor 3 by a predetermined reduction ratio, has a pinion gear 32 affixed to the outer circumference of the motor shaft (output shaft) 31 of the drive motor 3, intermediate gear 33 rotating engaged with the pinion gear 32, and valve gear 34 rotating engaged with this intermediate gear 33, and drives rotation of the throttle valve 1 and the throttle shaft 2.

The pinion gear 32 is a motor gear formed into a predetermined shape by a metal material and rotating integrally with a motor shaft 31 of the drive motor 3. The intermediate gear 33 is formed into a predetermined shape by a plastic material and is rotatably fit at the outer circumference of a support shaft 35 forming an axis of rotation. The intermediate gear 33 is provided with a large diameter gear 36 engaging with the pinion gear 32 and a small diameter gear 37 engaging with the valve gear 34. Further, the support shaft 35 is formed integrally by plastic forming at the outer wall of the bore wall 6 of the throttle body 5 and has a front end (right end in FIG. 1) fit into a recess formed in the inner walls of the gear cover 10.

The valve gear 34 is formed into a predetermined substantially ring shape by a plastic material and is formed with teeth 38 engaging with the small diameter gear 37 of the intermediate gear 33. The outer circumference of the tube formed integrally so as to stick out toward the left direction in FIG. 1 from the surface of the bore wall 6 side of the valve gear 34 functions as an inside gear 39 for holding the inside of the right end (in FIG. 1) of the return spring 4. Note that the outer circumference of the valve gear 34 is integrally formed with the above-mentioned full open stopper (not shown) which engages with the full open stopper integrally formed by plastic forming with the inner walls of the gear case 9.

The return spring 4 is attached to the outside of the metal shaft part 22 of the throttle shaft 2. One end is held at the outer wall of the bore wall 6 of the throttle body 5, that is, a body side hook (first engagement part, not shown) provided at the bottom of the tubular shaped recess of the gear case 9, while the other end (right end in FIG. 1) is held by a gear side hook (second engagement part, not shown) provided at the bore wall 6 side surface of the valve gear 34.

The throttle body 5 is a throttle housing having a tubular shaped bore wall 6 operably housing the throttle valve 1 inside it and forming inside the bore wall 6 a circular intake air passage through which intake air heading toward the engine flows. It holds in the bore of the bore wall 6 (in the intake passage) the throttle valve 1 so as to be able to rotate in the rotation direction from the full close position to the full open position and is fastened to an intake manifold of the engine using bolts, screws, or other fasteners (not shown).

The bore wall 6 of the throttle body 5 is provided with a tubular shaped first bearing support 41 for rotatably supporting a first sliding part of the plastic shaft part 21 of the throttle shaft 2 through an integral plug-type slide bearing 7 and a tubular shaped second bearing support 42 for rotatably supporting a second sliding part of the metal shaft part 22 of the throttle shaft 2 through a dry bearing (gear side slide bearing) 8.

The first bearing support 41 is provided with a round hole shaped first shaft insertion hole 43 for rotatably holding the first sliding part of the plastic shaft part 21, while the second bearing support 42 has a round hole shaped second shaft insertion hole 44 for rotatably holding the second sliding part of the metal shaft part 22. Note that the first bearing support 41 is arranged with its ring-shaped end face exposed to the outside facing the axial direction of the throttle shaft 2.

Further, the second bearing support 42 is integrally formed so as to stick out toward the outer wall of the bore wall 6 of the throttle body 5, that is, from the bottom of the tubular shaped recess of the gear case 9 toward the right direction in FIG. 1. The outer circumference functions as an inside guide 46 for holding the inside of the left end in FIG. 1 of the return spring 4. Further, the outer circumference and mounting stay of the bore wall 6 are formed with a plurality of (in the illustrated example, four) through holes 47 through which bolts, screws, or other fasteners are passed for fastening the throttle body 5 to the intake manifold of the engine.

Here, the bore wall 6 of the throttle body 5 of the present embodiment is formed into a predetermined shape by a plastic material (heat resistant resin such as polyphenylene sulfide (PPS) or polybutylene terephthalate containing 30% glass fiber (PBTG30)) and forms a double-wall structure comprised of a tubular shaped bore outer tube 51 in which a tubular shaped bore inner tube 52 is arranged forming an intake passage inside it. The bore outer tube 51 and bore inner tube 52 have an air inlet for taking in intake air from an air cleaner (not shown) through an intake pipe (not shown) and an air outlet for sending the intake air to a surge tank or intake manifold of the engine. They have substantially the same inner diameters and outer diameters in the direction of flow of the intake air.

Note that the bore inner tube 52 forms inside it an intake passage for supplying intake air to the engine. The throttle valve 1 and the throttle shaft 2 are housed inside it in a rotatable manner. Further, the ring-shaped space between the bore outer tube 51 and bore inner tube 52 is partitioned by a partition 53 across its entire circumference at its substantial center as shown in FIG. 2. Further, the ring-shaped space upstream of the partition 53, with a direction of flow of air shown by the arrows in FIG. 2, is made a recess (moisture trapping groove) 54 for blocking moisture flowing in along the inner circumference of the intake pipe. Further, the ring-shaped space downstream of the partition 53 is made a recess (moisture trapping groove) 55 for blocking moisture flowing in along the inner circumference of the intake manifold.

Note that, while not shown, the outer circumference of the bore outer tube 51 may also be provided with a bypass passage bypassing the throttle valve 1 and an idle speed control valve (ISC valve) for adjusting the amount of air flowing through it so as to control the idling speed of the engine. Further, the intake pipe upstream of the bore wall 6 of the throttle body 5 may be provided with an outlet of a positive crankcase ventilation (PCV) system or a purge tube of an evaporative emission control (ECC) system of fuel.

When a PCV system is provided, engine oil contained in blowby gas may be carried into the intake passage in a mist state. This mist-state engine oil may deposit on the inner wall of the intake pipe. Therefore, by using the above blocking recess 54 to block oil mist or deposits coming in along the inner wall of the intake pipe, it is possible to prevent malfunctions of the throttle valve 1 and the throttle shaft 2.

As explained above, the inner wall of the bore inner tube 52 of the bore wall 6 of the throttle body 5 of the present embodiment, that is, the wall of the intake passage, is provided with a full close stopper 24 for preventing rotation of the throttle valve 1 past the full close position. This full close stopper 25 is integrally formed at the walls of the intake passage so as to stick out to the inside from the inner wall of the bore inner tube 52.

The integral plug-type slide bearing of the present embodiment is formed by a plastic of the same type as the throttle body 5. By forming the plug by a material with good slidability and forming the plug and slide bearing integrally, it is possible to reduce the costs. This integral plug-type slide bearing 7 has the function of rotatably supporting the first sliding part of the plastic shaft part 21, the function of preventing entry of dust or other foreign matter from the outside to the inside of the throttle body 5 (intake passage), and the function of preventing leakage of intake air, oil mist, or other fluid from the inside of the throttle body 5 to the outside.

Further, the integral plug-type slide bearing 7 is comprised of a substantially disk-shaped closing part 61 forming the plug, a substantially ring-shaped flange 62 sticking outward in the radial direction from the outer circumference of the closing part 61, a closed bottom tube 63 formed integrally with the closing part 61 and forming the slide bearing, etc. The closing part 61 is a portion air-tightly blocking the opening of the first bearing support 41 of the throttle body 5.

Further, the flange 62 of the integral plug-type slide bearing 7 has an outer diameter larger than the tube 63 and has a ring-shaped end face to be fixed by welding to the end face of the tube sticking outward at the open side of the first bearing support 41 of the throttle body 5. Note that the ring-shaped end face of the flange 62 is formed facing the center of the bore of the bore wall 6 in the axial direction of the throttle shaft 2 and faces the ring-shaped end face of the first bearing support 41 of the throttle body 5.

Further, the inner circumference of the closed bottom tube 63 of the integral plug-type slide bearing 7 forms a bearing sliding surface for rotatably supporting the outer circumference of the first sliding part of the plastic shaft part 21 of the throttle shaft 2. The outer circumference is fit with clearance into the inner circumference of the first shaft insertion hole 43 of the first bearing support 41 of the throttle body 5. Note that the inner circumference of the first shaft insertion hole 43 and the outer circumference of the tube 63 of the integral plug-type slide bearing 7 are formed as cylindrical surfaces centered about the axial center of the plastic shaft part 21.

Here, it is preferable to set a ring-shaped clearance between the outer circumference of the closed bottom tube 63 and the inner circumference of the first shaft hole 43 so as to enable the tube 63 to be centered with respect to the axial center of the throttle shaft 2. Further, it is preferable to set the minimum ring-shaped clearance required for sliding and rotation of the shaft part 21 at the inside of the tube 63 between the inner circumference of the tube 63 and the outer circumference of the first sliding part of the plastic shaft part 21.

Next, the method of assembling the electronic control type throttle control device of the first embodiment will be briefly explained with reference to FIG. 1 and FIG. 2.

When assembling the closed-bottom tube 63 of the integral plug-type slide bearing 7 comprised of the plug and the slide bearing at the first bearing support 41, the throttle valve 1, throttle shaft 2, dry bearing 8, and oil seal are assembled in advance at the bore wall 6 and the first and second bearing supports 41 and 42 of the throttle body 5.

Guided by the outer circumference of the first sliding part of the plastic shaft part 21 of the throttle shaft 2, the closed bottom tube 63 of the integral plug-type slide bearing 7 is centered with respect to the dry bearing 8 and the first sliding part of the plastic shaft part 21 and inserted into the ring-shaped clearance formed between the inner circumference of the first shaft insertion hole 43 of the first bearing support 41 and the outer circumference of the first sliding part of the plastic shaft part 21, then the integral plug-type slide bearing 7 is held in that state.

Next, the plastic disk 20 of the throttle valve 1 is engaged with the full closed stopper 24 at the full close position of the throttle valve 1 (throttle valve 1 is brought into contact with the inner wall of the bore wall 6). In that state, the ring-shaped end face of the flange 62 of the integral plug-type slide bearing 7 is fixed by welding to the ring-shaped end face of the first bearing support 41 of the throttle body 5 using a hot welding method such as laser welding (axial direction bonding). That is, the flange 62 of the integral plug-type slide bearing 7 is fixed by welding to the ring-shaped end face of the first bearing support 41 of the throttle body 5 vertical to the first sliding part of the plastic shaft part 21 of the throttle shaft 2. Due to this, the axial center of the tube 63 of the slide bearing 7 will not shift with respect to the axial center of the throttle shaft 2 and it will become possible to easily fix the tube 63 of the slide bearing 7 in the first bearing support 41 of the throttle body 5.

Next, the action of the electronic control type throttle control device of the first embodiment will be briefly explained with reference to FIG. 1 and FIG. 2.

When a driver steps on the accelerator pedal, an opening degree signal is input to the ECU from the accelerator pedal. The drive motor 3 is then powered and the motor shaft 31 of the drive motor 3 turns so that the throttle valve 1 becomes a predetermined opening degree by the ECU. The torque of the drive motor 3 is transmitted to a pinion gear 32, intermediate gear 33, and valve gear 34. Due to this, the valve gear 34 turns by exactly the angle of rotation corresponding to the amount of depression of the accelerator pedal against the biasing force of the return spring 4.

Therefore, since the valve gear 34 turns, the throttle shaft 2 turns by exactly the same angle of rotation as the valve gear 34 and the throttle valve 1 is driven to turn in the direction opening from the full close position to the full open position. As a result, the intake passage formed in the bore inner tube 52 of the throttle body 5 is opened by exactly a predetermined opening degree, so the amount of intake air increases and the engine speed is changed to a speed corresponding to the amount of depression of the accelerator pedal.

Conversely, when the driver takes his or her foot off of the accelerator pedal, the accelerator pedal returns to its original position (idling position) and the torque of the drive motor 3 disappears, so the biasing force of the return spring 4 causes the throttle valve 1, throttle shaft 2, and valve gear 34 to also return to their original positions (full close position of throttle valve 1). Note that when the driver takes his or her foot off the accelerator pedal, an accelerator opening degree signal of 0% is output from the accelerator opening degree sensor, so it is also possible to have the ECU power the drive motor 3 and make the motor shaft 31 of the drive motor 3 turn in reverse so that that throttle valve 1 becomes the opening degree of the full close position. In this case, it is possible to positively drive rotation of the throttle valve 1 in the full closed direction by the drive motor 3.

At this time, the throttle valve 1 turns in the closing direction due to the biasing force of the return spring 4 until the valve load applying face of the full close stopper provided at the plastic disk 20 of the throttle valve 1 abuts against the valve load receiving face of the full close stopper 24 formed at the inner wall of the bore inner tube 52 of the bore wall 6. Further, since more rotational motion of the throttle valve 1 in the closing direction is stopped by the full close stopper 24, the throttle valve 1 is held at a predetermined full close position in the intake passage formed in the bore inner tube 52. Due to this, the engine speed becomes the idling speed.

Summarizing the effects of the first embodiment, as explained above, in the electronic control type throttle control device of the first embodiment, when assembling the tube 63 of the integral plug-type slide bearing 7 comprised of the plug and slide bearing formed together at the first bearing support 41 of the throttle body 5, the tube 63 of the slide bearing 7 is centered with respect to the plastic shaft part 21 of the throttle shaft 2 and the dry bearing 8, the tube 63 of the slide bearing 7 is inserted into the ring-shaped clearance formed between the inner circumference of the first shaft insertion hole 43 of the first bearing support 41 and the outer circumference of the first sliding part of the plastic shaft part 21, then the ring-shaped end face of the flange 62 of the slide bearing 7 is fixed by welding to the ring-shaped end face of the first bearing support 41 of the throttle body 5 using a hot welding method such as laser welding (axial direction bonding).

Due to this, even when welding together plastic parts with poorer dimensional precision or parts precision resulting from molding shrinkage compared with machined parts (plastic throttle body 5 and plastic integral plug-type slide bearing 7), it is possible to absorb variations in inner and outer diameters or other dimensions of the plastic disk 20 of the throttle valve 1, the plastic shaft part 21 of the throttle shaft 2, the bore wall 6 or first bearing support 41 of the throttle body 5, and the tube 63 of the slide bearing 7. Due to this, even if the parts precision or dimensional precision of the plastic disk 20 of the throttle valve 1 and bore wall 6 of the throttle body 5 or first bearing support 41 is not that good, it is possible to provide a method of assembly optimal for the plastic integral plug-type slide bearing 7 to be assembled in the first bearing support 41 of the non-machined plastic throttle body 5. Further, it is possible to improve the precision of assembly and reduce the number of assembly steps when assembling the tube 63 of the integral plug-type slide bearing 7 in the first bearing support 41 of the throttle body 5 compared with the related art (press fitting outer circumference of tube of integral plug-type slide bearing into inner circumference of bearing support of throttle body).

Further, since it is possible to set the clearance between the outer circumference of the plastic disk 20 of the throttle valve 1 and the inner wall of the bore wall 6 at the time of full closing to the minimum extent, it is possible to reduce the amount of leakage at the time of full closing of the throttle valve 1 (idling operation) and perform normal idling control. That is, it is possible to prevent an increase in the amount of leakage at the time of full closing of the throttle valve 1 due to the enlargement of the full closed clearance between the outer circumference of the plastic disk 20 of the throttle valve 1 and the inner walls of the bore wall 6, so it is possible to increase the idling speed of the internal combustion engine over the target value.

Further, since it is possible to prevent an increase in the amount of leakage when the throttle valve 1 is fully closed, it is possible to prevent over movement of the full close position of the throttle valve 1 to the closing side. Therefore, there will be no phenomenon where, before the rotational motion of the throttle valve 1 is stopped by the full close stopper 24 etc. at the full close position, the outer circumference of the plastic disk 20 of the throttle valve 1 will interfere with the inner circumference of the bore wall 6 of the throttle body 5 and lock. Therefore, the throttle valve 1 can be stopped at a predetermined full close position.

Further, since it is not necessary to enlarge the ring-shaped clearance formed between the outer circumference of the first sliding part of the plastic shaft part 21 of the throttle shaft 2 and the inner circumference of the closed-bottom tube 63 of the integral plug-type slide bearing 7, it is possible to prevent an increase in rotational displacement of the first sliding part of the plastic shaft part 21 due to shifting of the throttle shaft 2 and the resultant abnormal wear of the bearing (abnormal wear of inner circumference of tube 63 of integral plug-type slide bearing 7) and possible to prevent the problem of valve locking. Due to this, it is possible to control the opening degree of the throttle valve 1 as targeted.

Second Embodiment

Figure 3:
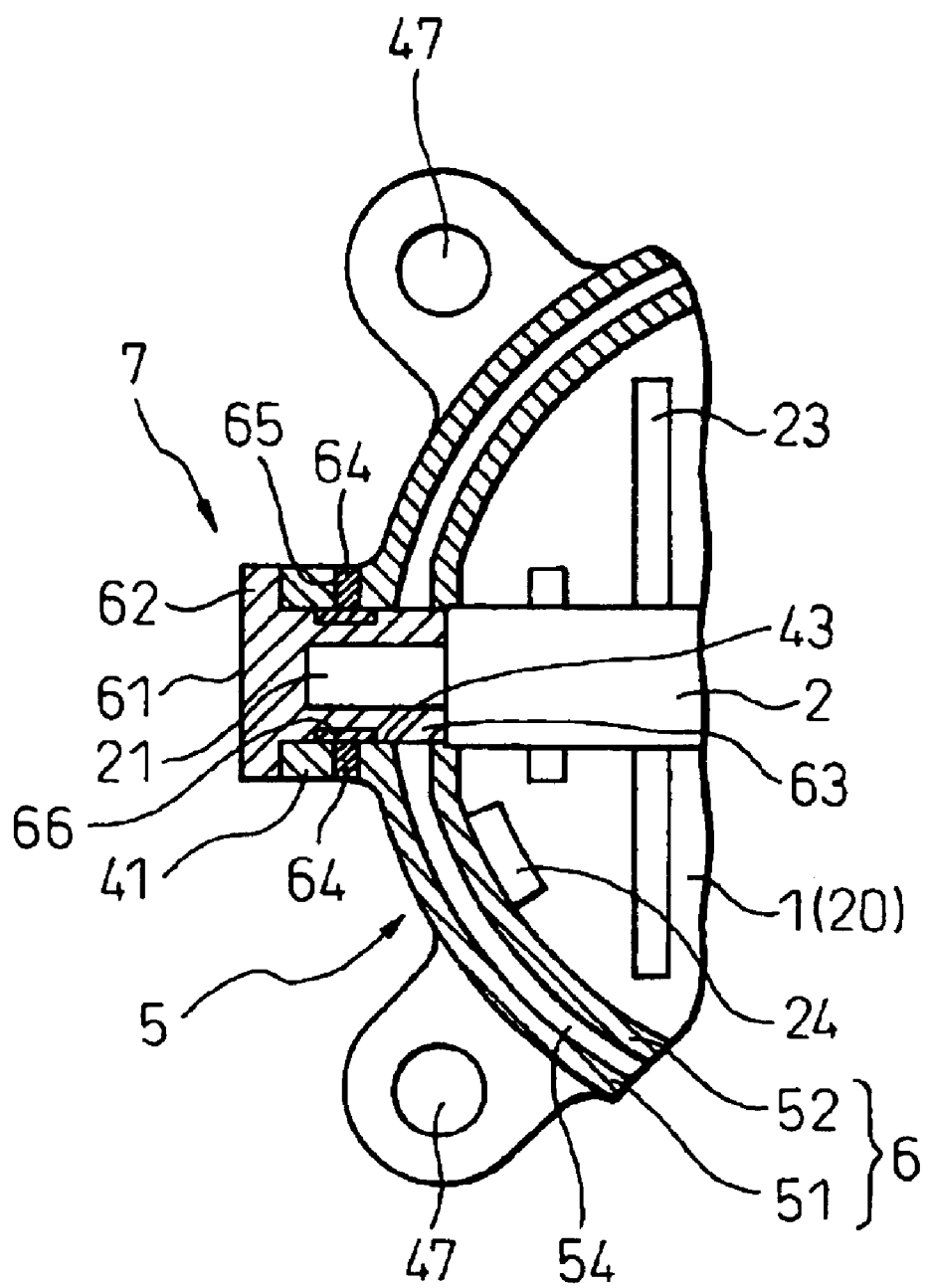
FIG. 3 is a cross-sectional view of the main structure of an electronic control type throttle control device according to a second embodiment of the present invention.
Figure 4:
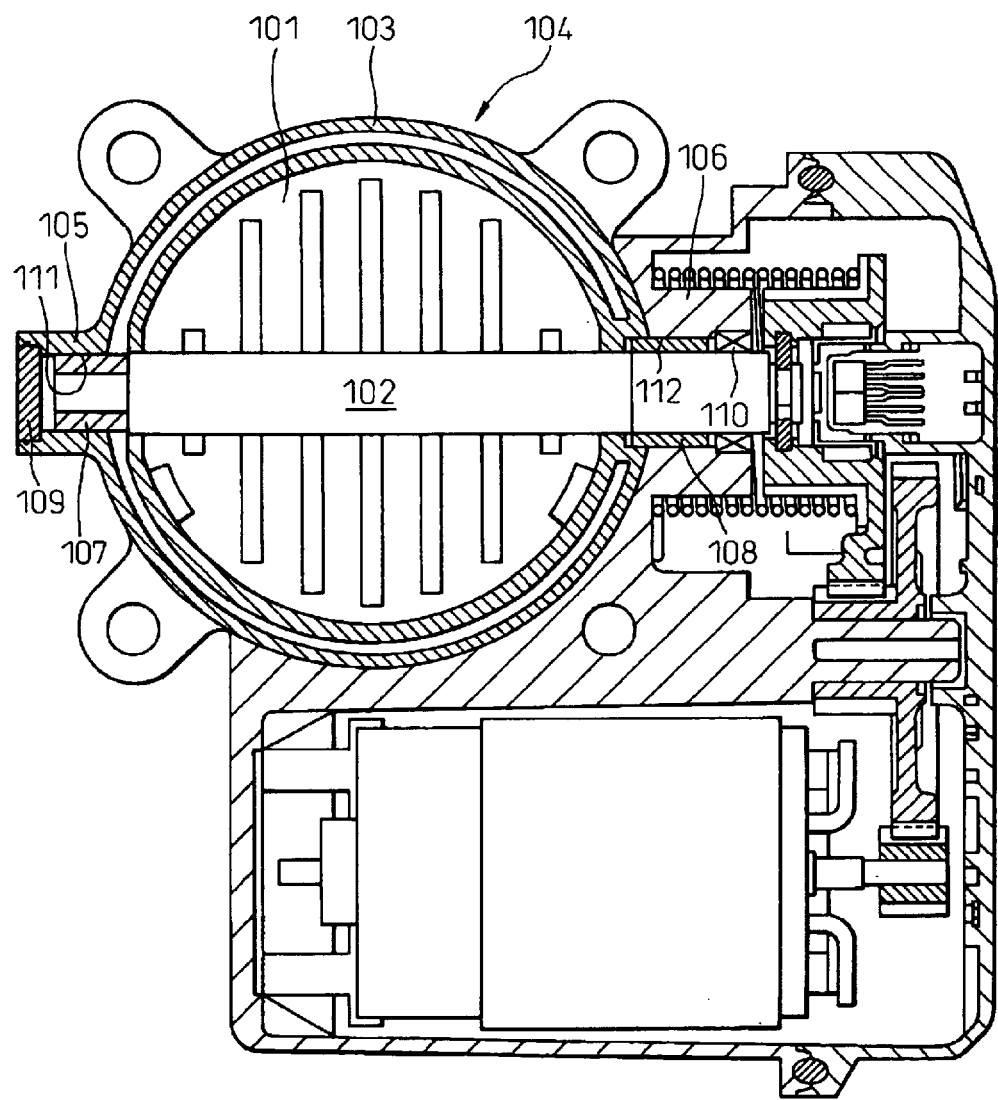
FIG. 4 is a cross-sectional view of the overall structure of a throttle device for an internal combustion engine according to the related art.

FIG. 3 shows a second embodiment of the present invention and illustrates only the main structure of an electronic control type throttle control device.

In the second embodiment, the first bearing support 41 of the throttle body 5 is provided with a single communication hole 64 communicating the outer circumference and inner circumference or two or more holes at predetermined intervals (for example, at equal intervals in the circumferential direction). The communication holes 64 are used as gates for pouring a molten plastic into the circumferential direction ring-shaped clearance formed between the outer circumference of the closed bottom tube 63 of the integral plug-type slide bearing 7 and the first shaft insertion hole 43 of the first shaft bearing 41 of the throttle body 5. Further, the tube 63 of the slide bearing 7 is fixed by welding to the first bearing support 41 of the throttle body 5 through the plastic material 65 poured from the communication holes 64.

Further, the outer circumference of the closed-bottom tube 63 of the integral plug-type slide bearing 7 facing the communication holes 64 is formed with a ring-shaped groove 66 for improving the bond strength with the inner circumference of the first bearing support 41 through the plastic material 65. Note that it is also possible to leave out the ring-shaped groove 66 and make the outer circumference of the tube 63 a simple cylindrical surface. Further, instead of the ring-shaped groove 66, it is also possible to form a partial ring-shaped recess or mesh-like or lattice-like notches.

Further, when assembling the tube 63 of the integral plug-type slide bearing 7 comprised of the plug and slide bearing at the first bearing support 41 of the throttle body 5, first, in the same way as the first embodiment, the flange 62 of the integral plug-type slide bearing 7 is fixed by welding to the ring-shaped end face of the first bearing support 41 of the throttle body 5 (axial direction welding).

After this, molten plastic is poured from the communication holes 64 into the ring-shaped clearance (ring-shaped groove) formed between the outer circumference of the tube 63 of the slide bearing 7 and the first shaft insertion hole 43 of the first bearing support 41 of the throttle body 5, fills the communication holes 64 and the clearance, then is solidified so as to fix by welding the tube 63 to the first bearing support 41 through the plastic material 65 (radial direction bonding).

Other Embodiments

In the above embodiments, the example of use of a Hall element 13 as the non-contact type detection element was explained, but it is also possible to use a Hall IC or magneto resistance element etc. as the non-contact type detection element. Further, in the above embodiment, the example of use of a split-type permanent magnet 11 as the source of generation of the magnetic field was explained, but it is also possible to use a tubular shaped permanent magnet as the source of generation of the magnetic field.

Further, in the above embodiments, an electronic control type throttle control device driving rotation of the valve gear 34 and throttle shaft 2 by a drive motor 3 or other actuator via a reduction gear so as to rotate the throttle valve 1 was explained, but the present invention may also be applied to a throttle device for an internal combustion engine which transmits the amount of depression of an accelerator pedal to the throttle valve and throttle shaft mechanically through a wire cable so as to operate the throttle valve.

In the above embodiments, the bore wall 6 of the throttle body 5 was made a double-wall structure comprised of a tubular shaped bore outer tube 51 and a tubular shaped bore inner tube 52 arranged concentrically inside it, but it is also possible to make it a double-wall structure of a bore outer tube 51 and a bore inner tube 52 arranged with an axial center offset from the axial center of the outer tube in the vertical direction or lateral direction in FIG. 1. Further, the bore wall 6 of the throttle body 5 is not limited to a double-wall structure and may also be a single-wall structure.

In the above embodiments, provision was made of recesses 54 and 55 blocking moisture from flowing into the bore wall 6 from the upstream side and downstream side of the throttle valve 1 with the purpose of preventing introduction of engine coolant water to the throttle body 5, preventing icing of the throttle valve 1 at cold times in the winter etc., and reducing the number of parts, but it is also possible to provide only the recess 54 for blocking moisture flowing into the bore wall 6 along the inner circumference of the intake pipe at the upstream side of the throttle valve 1.

In the above embodiments, a full close stopper 24 for stopping the rotational motion of the throttle valve 1 at the full close position was integrally formed at the inner walls of the bore wall 6 of the plastic throttle body 5, but it is also possible to integrally form a full close stopper for stopping the rotational motion of the valve gear 34 at the full close position of the throttle valve 1 at the inner wall of the plastic gear case 9. Further, it is also possible to integrally form the full close stopper by casting at the inner wall of the bore wall of an aluminum die cast throttle body or the inner wall of the gear case.

In the above embodiments, the plastic disk 20 of the throttle valve 1 was integrally formed at the outer circumference of the plastic shaft part 21 of the throttle shaft 2, but it is also possible to fit for example a tubular shaped plastic shaft part of the throttle valve 1 over the outer circumference of a valve holding part of a metal material throttle shaft. Further, it is also possible to form both the throttle valve and the throttle shaft by a metal material or plastic material and fasten the throttle valve and throttle shaft together by a fastening member.

In the above embodiments, the integral plug-type slide bearing 7 was formed integrally by plastic forming by a heat resistant plastic of the same type as the throttle body 5, but it is also possible to make only the inner circumference of the closed-bottom tube of the slide bearing 7 by which the shaft slides a low wear material superior in slidability and either insert mold a low wear material at the outer circumference of the tube 63 or integrally form it by the same plastic.

While the invention has been described with reference to specific embodiments chosen for purpose of illustration, it should be apparent that numerous modifications could be made thereto by those skilled in the art without departing from the basic concept and scope of the invention.

What is claimed is:

1. A throttle device for an internal combustion engine comprised of:
   a throttle shaft rotating integrally with a throttle valve and having a sliding part with respect to a bearing at one end,
   a throttle body having a bore wall holding inside it said throttle valve in an operable state and a tubular bearing support supporting said sliding part of the throttle shaft, and
   an integral plug-type slide bearing accommodated and held in an inner circumference of said bearing support of the throttle body, rotatably supporting said sliding part of the throttle shaft, and air-tightly closing an opening of said bearing support of the throttle body,
   said throttle body having in said bearing support a shaft insertion hole in which said sliding part of the throttle shaft is inserted and having a ring-shaped end face at an open side of said bearing support, and
   said integral plug-type slide bearing having a closed-bottom tube rotatably and slidably supporting said sliding part of the throttle shaft and fit at its outer circumference in said shaft insertion hole with a clearance and a flange having an outer diameter larger than that tube and affixed to a ring-shaped end face of said bearing support.

2. A throttle device for an internal combustion engine as set forth in claim 1, wherein
   said bearing support of the throttle body is formed integrally by a heat resistant plastic,
   said flange of the integral-plug type slide bearing is formed by the same type of plastic as said bearing support and has a ring-shaped end face fixed by welding to said ring-shaped end face of the bearing support,
   said ring-shaped end face of the bearing support is formed facing the outside from a center of said bore wall in an axial direction of said throttle shaft, and
   said ring-shaped end face of said flange is formed facing the center of said bore wall in an axial direction of said throttle shaft and facing said ring-shaped end face of the bearing support.

3. A throttle device for an internal combustion engine as set forth in claim 2, wherein
   when assembling said integral plug-type slide bearing into said bearing support of the throttle body, said tube is centered with said throttle shaft and the ring-shaped end face of said flange is fixed by welding to the ring-shaped end face of said bearing support.

4. A throttle device for an internal combustion engine as set forth in claim 1, wherein
   said bearing support of the throttle body is integrally formed by a heat resistant plastic,
   an inner circumference of said shaft insertion hole is formed as a cylindrical surface centered about the axial center of said throttle shaft,
   said tube of said integral plug-shaped bearing is formed from a plastic of the same type as said bearing support and has an outer circumference fixed by fusing to the inner circumference of said shaft insertion hole, and
   the outer circumference of said tube is formed as a cylindrical surface centered about the axial center of said throttle shaft.

5. A throttle device for an internal combustion engine as set forth in claim 4, wherein
   when assembling said integral plug-type slide bearing into said bearing support of the throttle body, a fusing use molten plastic is poured into the ring-shaped clearance formed between the outer circumference of said tube and the inner circumference of said shaft insertion hole and the outer circumference of said tube is fixed by welding to the inner circumference of said shaft insertion hole.

6. A throttle device for an internal combustion engine as set forth in claim 1, wherein said integral plug-type slide bearing has at least one of a function of rotatably and slidably supporting said sliding part of the throttle shaft, a function of preventing entry of foreign matter from the outside to the inside, and a function of preventing leakage of air from the inside to the outside.

7. A throttle device for an internal combustion engine as set forth in claim 1, wherein said integral plug-type slide bearing is formed integrally by insert molding by a material superior in slidability at only an inner circumference of said tube.

* * * * *